United States Patent Office 3,586,507

Patented June 22, 1971

3,586,507

DIAZO PRINTING PLATE HAVING PRINTING SURFACE OF THERMALLY CURED ALLYLIC RESIN

Leo S. Burnett, Scarsdale, N.Y., assignor to FMC Corporation, New York, N.Y.

No Drawing. Filed Dec. 14, 1967, Ser. No. 690,408
Int. Cl. B41m *1/06*; G03f *7/10*
U.S. Cl. 96—75 5 Claims

ABSTRACT OF THE DISCLOSURE

Presensitized diazo lithographic printing plates are prepared in which the diazo layer is overcoated with a light permeable thermally cured allylic resin. After exposure and developing in essentially the usual manner, the resin coating becomes detached or otherwise removed over those areas dissolved out by the processing solution. The resulting plate contains image areas of cured allylic resin bonded to the remaining insoluble diazo image. After gumming and inking, the plate is ready for printing.

BACKGROUND OF THE INVENTION

(A) Field of the invention

This invention relates to photolithographic reproduction. More particularly it pertains to diazo lithographic printing plates having extended press life.

(B) Description of the prior art

The use of light sensitive diazo compounds for the production of planographic printing plates is well known to photolithographic art. Such plates are formulated by coating a base with a diazo sensitizer whose light decomposition products are opposite in their ink receptivity to that of the sensitizer itself. The diazo may be initially ink receptive or ink repellent. Whereas the former produces an ink repellent, or oleophobic image in the light struck areas, the latter produces an ink attractive or oleophilic image. Both positive and negative working printing plates are thus possible. For a more detailed discussion on the use of light sensitive diazo materials in printing, reference is made to the well-known treatise "Light Sensitive Systems" by Jaromir Kosar, John Wiley and Sons, Inc., New York, N.Y., 1965.

Although superior to the old dichromated colloids, with their low and variable light sensitivity and poor shelf life, diazo printing systems are still in need of further improvement. It is generally conceded by those in the trade that the chief drawback of diazo presensitized plates is their short press life. Apparently the printing surfaces formed after development are not sufficiently tough or durable to withstand prolonged press operation.

There have been proposals for extending the press life of diazo printing plates. Generally speaking such suggestions have called for coating the printing surfaces with more durable materials. For instance, U.S. Pat. 3,136,637 advocates applying poly(vinyl formal) lacquers to attain increased image toughness. A similar approach is taken by the author of U.S. Pat. 2,714,066. Although an advance over the prior art, such modified plates still do not possess the durability for holding up under extended press operations. A truly durable presensitized plate base on light sensitive diazo compounds continues to be a much sought after goal in the photolithographic arts.

SUMMARY OF THE INVENTION

It has now been discovered that lithographic printing plates having extended press life, and derived from photosensitive diazo layers, can be achieved by coating such layers with a cured allylic resin and the provision of such printing plates, including the production and use thereof, constitutes the principal object and purpose of the invention. Other objects and purposes will become manifest in the ensuing description.

DESCRIPTION OF THE INVENTION AND THE PREFERRED EMBODIMENTS

In carrying out the invention, a curable, or crosslinkable, allylic resin having residual allylic unsaturation in the form of unsaturated allyl ester groupings, is applied over the photosensitive layer of a presensitized printing plate in which the photosensitive layer is a light sensitive diazo compound. The so-coated plate is then treated to effect curing of the allylic resin. After exposure to a light pattern, the plate is developed in essentially the known manner whereby the cured allylic resin is removed above the hydrophilic, or oleophobic areas of the exposed plate while leaving the resin layer intact above the oleophilic areas. Apparently the alkaline processing solutions soften the cured resin coating over the hydrophilic regions causing it to be softened and thereby become detached. The resulting plate has printing surfaces of cured allylic resin and is capable of withstanding long press runs without appreciable image deterioration.

Presensitized diazo printing plates used in the practice of the invention are known entities as was pointed out in the "Description of the Prior Art." They can be positive working or negative working depending on the type of light sensitive diazo component. The positive working plate commonly contains, as the light sensitive layer, a quinone diazide whose photolyzed products are oleophobic, in contrast to the oleophilic character of the original diazo. The negative working plates commonly contain as a light sensitive layer, a diazo resin such as diazodiphenylamine-formaldehyde resin whose photolyzed products are oleophilic in contrast to the original diazo material which is oleophobic. A comprehensive description and discussion of both types of these diazo compounds is set forth in the aforereferred to Kosar.

The cured allylic resin coating is formed by applying to the diazo layer of a presensitized printing plate, a solvent solution of a heat curable allylic resin having residual allylic ester unsaturation. After drying to remove the solvent, the coated plate is then heated to effect curing of the resin. Curing temperatures are desirably from about 200° F. to about 350° F., preferably in the vicinity of 250° F. Suitable solvents for the curable allylic resin are the normally liquid, relatively inert organic solvents as represented by the various hydrocarbons, both aliphatic and aromatic, and their chlorinated derivatives, ketones, alcohols, Cellosolves, ethers and the like. The depth of the cured allylic coating should be adjusted whereby it will become detached over the oleophobic areas of the exposed plate during the development procedure. A preferred base or support material is aluminum. Evidence amassed thus far indicates that the coating should be sufficiently thin to permit at least partial penetration by the processing solutions to the oleophobic areas. In general, we have found that a coating thickness of from about .02 mil to about .10 mil is satisfactory with optimum thickness in the neighborhood of .06 mil. Exposure, development, inking and the like, follow generally the techniques practiced in the processing of diazo presensitized printing plates.

The present invention thus provides the art with a planographic printing plate having unusually long press life without resorting to complex and expensive materials and construction. It is, for example, especially advantageous that no new developing technique and materials are required in the processing of our new presensitized printing plates.

The curing of the allylic resin can be effected by heat alone although it is preferred to use peroxide catalysts since these agencies reduce curing times and at the same time produce a tougher film. Exemplary peroxides include hydrogen peroxide, aliphatic hydroperoxides, i.e., methyl hydroperoxide, ethyl hydroperoxide, t-butyl hydroperoxide, hexyl hydroperoxide, octyl hydroperoxide, transdecalin hydroperoxide, 1-methylcyclopentyl hydroperoxide, 1,1-dimethyl - 2 - propenyl hydroperoxide, 2-cyclohexene-1-yl hydroperoxide, cumene hydroperoxide tetralin hydroperoxide triphenylmethyl hydroperoxide etc.; peroxides of the formula ROOR' wherein R and R', which may or may not be alike, can be alkyl such as methyl, ethyl, propyl, butyl, pentyl, hexyl, octyl, nonyl, decyl, undecyl, etc.; aralkyl, i.e., benzyl, phenethyl, phenylpropyl, naphthylethyl, naphthylmethyl, naphthylpropyl, etc.; aryl such as phenyl, naphthyl, etc.; aliphatic acyl such as acetyl, propionyl, butyryl, valeryl, etc.; aromatic acyl such as benzoyl, naphthoyl, etc.; peroxy acids, i.e., aliphatic peroxy acids, e.g., peracetic acid, perpropionic acid, perbutyric acid, etc.; aromatic peroxy acids, i.e., perbenzoic acid, perphthalic acid, etc.; esters of the aforesaid peroxy acids; salts of peracids such as ammonium persulfate, etc. Such compounds are well known and their description and preparation can be found in the chemical literature. An especially informative treatise is the well-known "Organic Peroxides," by Arthur V. Toblsky and Robert B. Mesrobian, and published by Interscience Publishers, Inc., New York, N.Y., and Interscience Publishers, Ltd., London (1954).

Any suitable amount of catalyst may be used but, in general, it is used in the range of about 0.1 to about 6.0% by weight of the whole; dicumyl peroxide, tert.-butyl perbenzoate and tert.-butyl hydroperoxide are preferred examples.

The crosslinkable, or heat-curable, allylic resins used herein are formed by the polymerization of an addition polymerizable allyl carboxylic ester having a plurality of ethylenically unsaturated linkages at least one of which is an allyl ester group.

Exemplary crosslinkable allylic resin systems are enumerated in the following list:

(a) Prepolymers derived from allyl esters of unsaturated monobasic acids having either the general formula $C_nH_{2n-1}COOR$ or $C_nH_{2n-1-y}X_yCOOR$, such as allyl acrylate, allyl chloroacrylate, allyl methacrylate, allyl crotonate, allyl cinnamate, allyl cinnamalacetate, allyl furoate, and allyl furfurylacrylate. It is to be understood that in all formulas used herein, R is an allyl group, $n$ can be any integer from 1 to 17 inclusive, except where the acid is unsaturated in which case $n$ is 2 to 17, $y$ is 1 or 2, and X is a halogen, hydroxyl, phenyl, substituted phenyl or furfuryl group or an alkyl or alkoxy group having 1–4 carbon atoms.

(b) Precopolymers of allyl esters of unsaturated monobasic acids; such as allyl methacrylate with butadiene, allyl methacrylate with methyl methacrylate, allyl methacrylate with styrene, allyl methacrylate with vinylidene chloride, allyl crotonate with methyl methacrylate, allyl crotonate with styrene, allyl crotonate with vinyl chloride, allyl crotonate with vinyl acetate, allyl crotonate with vinylidene chloride, allyl crotonate with diethyleneglycol maleate, allyl cinnamate with vinylidene chloride, allyl cinnamate with styrene, allyl cinnamate with cinnamyl cinnamate, allyl furoate with styrene and allyl furoate with vinylidene chloride.

(c) Prepolymers derived from allyl esters of aliphatic carboxylic acids having two or more allyl groups and having one of the following general formulas:

$$C_nH_{2n}(COOR)_2,\ C_nH_{2n-1}(COOR)_3$$

$$C_nH_{2n-y}X_y(COOR)_2,\ C_nH_{2n-1-y}X_y(COOR)_3$$

$$C_nH_{2n-2}(COOR)_2,\ C_nH_{2n-2-y}X_y(COOR)_2$$

or ROOCOR, such as diallyl oxalate, diallyl malonate, diallyl succinate, diallyl sebacate, diallyl maleate, diallyl fumarate, diallyl itaconate, diallyl tartrate, diallyl carbonate, diallyl adipate, triallyl citrate, triallyl carballylate, diallyl maleate and diallyl citroconate.

(d) Precopolymers of allyl esters of aliphatic carboxylic acids having two or more allyl groups; such as diallyl oxalate with vinylidene chloride, diallyl oxalate with styrene, diallyl malonate with vinylidene chloride, diallyl succinate with vinylacetate, diallyl succinate with vinylidene chloride, diallyl succinate with polyvinyl acetate, diallyl adipate with vinylidene chloride, diallyl sebacate with vinylidene chloride, diallyl maleate with methyl methacrylate, diallyl maleate with styrene, diallyl maleate with vinylidene chloride, and dially carbonate with methyl methacrylate.

In the aromatic series and heterocyclic are those crosslinkable prepolymer resins derived from an allyl ester in which the acid is normally of the benzene, naphthalene and cyanuric acid series, typical monomers being diallyl isophthalate, diallyl terephthalate, diallyl orthophthalate, triallyl cyanurate, triallyl mellitate, tetraallyl pyromellitate and the like.

In the manufacture of crosslinkable allyl resins, also known as prepolymers, the monomeric materials are polymerized in the conventional fashion to produce a solution of a soluble polymer in the monomer to the point short of gelation which occurs when the molecular weight of the polymer approaches that point where it becomes insoluble in the monomer. These polymer solutions, or dopes, are then separated into a solvent-soluble prepolymer fraction and a monomer fraction. This is effected by treatment with a solvent which dissolves the monomer while precipitating the polymerized portion or by other means which will leave a soluble prepolymer substantially free of monomer. A typical method for separating such crosslinkable prepolymers is described in U.S. Pat. 3,030,341.

Reference is now made to the following non-limiting examples.

EXAMPLE 1

A grained aluminum substrate was coated with a 2% dioxane solution of the condensation product obtained by condensing 2 moles of naphthoquinone - (1,2) - diazide-(2) - 5 - sulfochloride, (2-diazonaphthol-(1)-5-sulfochloride) with 1 mole of 4-amino-4'-hydroxydiphenyl in aqueous dioxane in the presence of sodium carbonate at slightly elevated temperature. The diazo compound is specifically described in U.S. Pat. 3,046,110. After drying, the thus obtained light sensitive foil was overcoated with a 6.0% solution of diallyl m-phthalate prepolymer in xylene containing a catalytic mixture of tert.-butylperbenzoate and benzoyl peroxide. The coating was applied using a laboratory type whirler and the concentration of each catalyst amounts to 1.5 parts per 100 parts of the prepolymer.

After evaporation of solvent, the plate was heated to 250° F. for three minutes to effect thermal curing of the diallyl phthalate resin. The coating thickness was approximately 0.06 mil.

The presensitized plate as above prepared was exposed through a positive transparency to carbon arc radiation for 1 minute. The exposed plate was developed by application of a developing solution composed of 1 part of 28% ammonium hydroxide and 5 parts of water and containing sodium hydroxide to pH of 12.0. The plate was thoroughly rubbed with the developer until the exposed areas of the plate were free of coating and the aluminum took on a clean, bright appearance.

After application of a phosphoric acid-gum arabic desensitizer, the plate was placed in an office copying machine, inked and printed copies run off.

EXAMPLE 2

The procedure of Example 1 was again carried out but in this instance the photosensitive diazo layer contained as the diazo component, a p-diazodiphenylamine-formaldehyde resin whose photolytic products are hydrophobic. The resulting processed plate is thus negative working.

The description and preparation of the p-diazodiphenylamine-formaldehyde resin is set forth in the technical literature to which reference is hereby made. It can also be purchased from suppliers of chemicals and photographic materials. The generally employed procedure for making the compound is to condense p-diazodiphenylamine with paraformaldehyde in the presence of anhydrous zinc chloride. The purified resin is a bright yellow solid which is soluble in organic solvents.

What is claimed is:

1. A presensitized printing plate comprising (1) a support base having thereon (2) a photosensitive diazo layer characterized in that upon exposure to a light pattern there is formed on said layer, image and non-image areas one of which is oleophobic and the other of which is oleophilic and (3) a continuous coating on said diazo layer of a light permeable thermally cured allylic resin, said coating being removable over the oleophobic areas during the normal development of the exposed plate.

2. The construction of claim 1 wherein the base support is aluminum.

3. The construction of claim 1 wherein the cured allylic resin is prepared from a diallyl phthalate prepolymer.

4. The construction of claim 1 wherein the diazo layer contains as the diazo component, a p-diazodiphenylamine-formaldehyde resin.

5. The construction of claim 1 wherein the diazo layer contains as the light sensitive diazo a quinone diazide.

References Cited

UNITED STATES PATENTS

| | | | |
|---|---|---|---|
| 3,046,110 | 7/1962 | Schmidt | 96—33 |
| 3,046,112 | 7/1962 | Schmidt et al. | 96—91(D)X |
| 3,126,281 | 3/1964 | Sus et al. | 96—75 |
| 3,462,267 | 8/1969 | Giangualano et al. | 96—33 |

WILLIAM D. MARTIN, Primary Examiner

R. HUSACK, Assistant Examiner

U.S. Cl. X.R.

96—33, 36.3, 91; 101—457